(12) United States Patent
Rutter, Sr.

(10) Patent No.: US 7,033,055 B1
(45) Date of Patent: Apr. 25, 2006

(54) EMERGENCY LIGHT SYSTEM

(76) Inventor: David Rutter, Sr., 7909 31st St, Baltimore, MD (US) 21237

( * ) Notice: Subject to any disclaimer, the term of this patent is extended or adjusted under 35 U.S.C. 154(b) by 75 days.

(21) Appl. No.: 10/700,953

(22) Filed: Oct. 31, 2003

(51) Int. Cl.
B60Q 1/26 (2006.01)

(52) U.S. Cl. .................. 362/540; 362/34; 362/84; 362/252; 362/477

(58) Field of Classification Search .............. 362/34, 362/84, 249, 252, 333, 540, 477
See application file for complete search history.

(56) References Cited

U.S. PATENT DOCUMENTS

| | | | | |
|---|---|---|---|---|
| 2,125,403 A | * | 8/1938 | Slutsky | 40/579 |
| 3,500,033 A | * | 3/1970 | Cole Jr., et al. | 362/34 |
| 3,539,794 A | * | 11/1970 | Kennerly et al. | 362/34 |
| 3,940,604 A | * | 2/1976 | Rauhut | 362/34 |
| 4,405,973 A | * | 9/1983 | Moscarillo | 362/34 |
| 4,635,166 A | * | 1/1987 | Cameron | 362/34 |
| 4,814,949 A | * | 3/1989 | Elliott | 362/34 |
| 4,972,300 A | * | 11/1990 | Beisswanger et al. | 362/34 |
| 5,043,851 A | * | 8/1991 | Kaplan | 362/34 |
| 5,381,312 A | * | 1/1995 | Authier | 362/470 |
| 5,416,670 A | * | 5/1995 | Authier | 362/34 |
| 5,446,629 A | * | 8/1995 | Steiger et al. | 362/34 |
| 5,797,669 A | * | 8/1998 | Fujita | 362/34 |
| 6,033,080 A | * | 3/2000 | Hasegawa et al. | 362/34 |
| 6,231,217 B1 | * | 5/2001 | Krippelz, Sr. | 362/477 |
| 6,336,729 B1 | * | 1/2002 | Pavelle et al. | 362/34 |
| 6,550,929 B1 | * | 4/2003 | Dumas | 362/84 |

* cited by examiner

Primary Examiner—Stephen Husar
Assistant Examiner—Jason Han

(57) ABSTRACT

A emergency light system for providing emergency lighting identification of a vehicle. The emergency light system includes a plurality of light emitting members being designed for being coupled to the vehicle whereby each of the light emitting members emits light to visually indicate the location of the vehicle. Each of a plurality of holder members selectively receives one of the light emitting members. Each of the holder members is designed for being coupled to the vehicle whereby each of the holder members is for selectively securing the light emitting members to the vehicle.

13 Claims, 3 Drawing Sheets

EMERGENCY LIGHT SYSTEM

BACKGROUND OF THE INVENTION

1. Field of the Invention

The present invention relates to emergency light fixtures and more particularly pertains to a new emergency light system for providing emergency lighting identification of a vehicle.

2. Description of the Prior Art

The use of emergency light fixtures is known in the prior art. U.S. Pat. No. 5,446,629 describes a device for actuating a light stick to emit light during emergency situations. Another type of emergency light fixture is U.S. Pat. Nos. 4,814,949 and 5,043,851 each have a chemiluminescent device that uses a chemical compound for producing light.

While these devices fulfill their respective, particular objectives and requirements, the need remains for a system that has certain improved features allowing for securing emergency lights to a vehicle in case of emergency.

SUMMARY OF THE INVENTION

The present invention meets the needs presented above by providing holder members that are coupled to the vehicle and readily receive the light emitting members to visually indicate the location of the vehicle.

Still yet another object of the present invention is to provide a new emergency light system that does not require electricity to allow the vehicle to be seen.

To this end, the present invention generally comprises a plurality of light emitting members being designed for being coupled to the vehicle whereby each of the light emitting members emits light to visually indicate the location of the vehicle. Each of a plurality of holder members selectively receives one of the light emitting members. Each of the holder members is designed for being coupled to the vehicle whereby each of the holder members is for selectively securing the light emitting members to the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
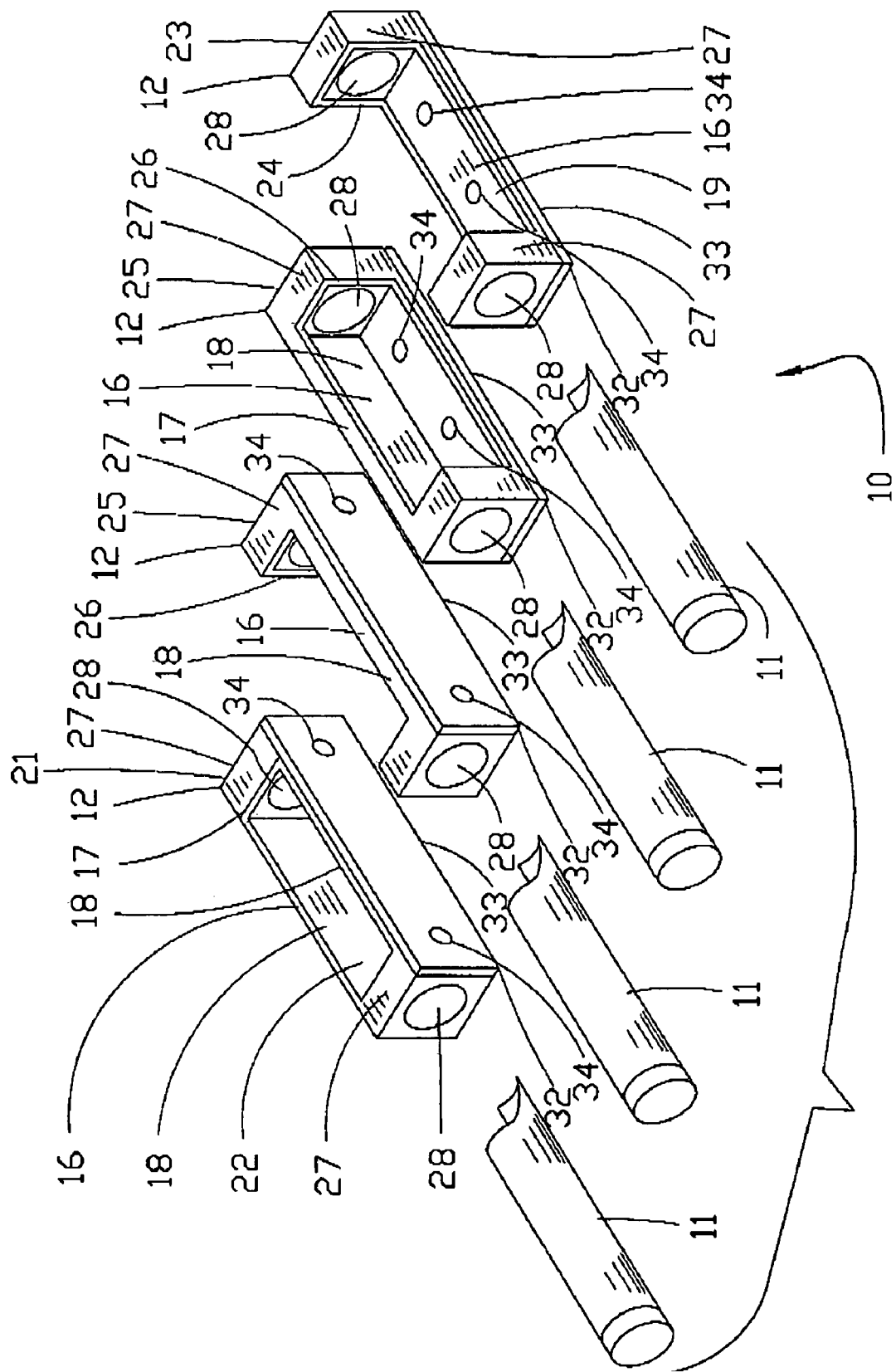
FIG. 1 is an exploded perspective view of a new emergency light system according to the present invention.
Figure 2:
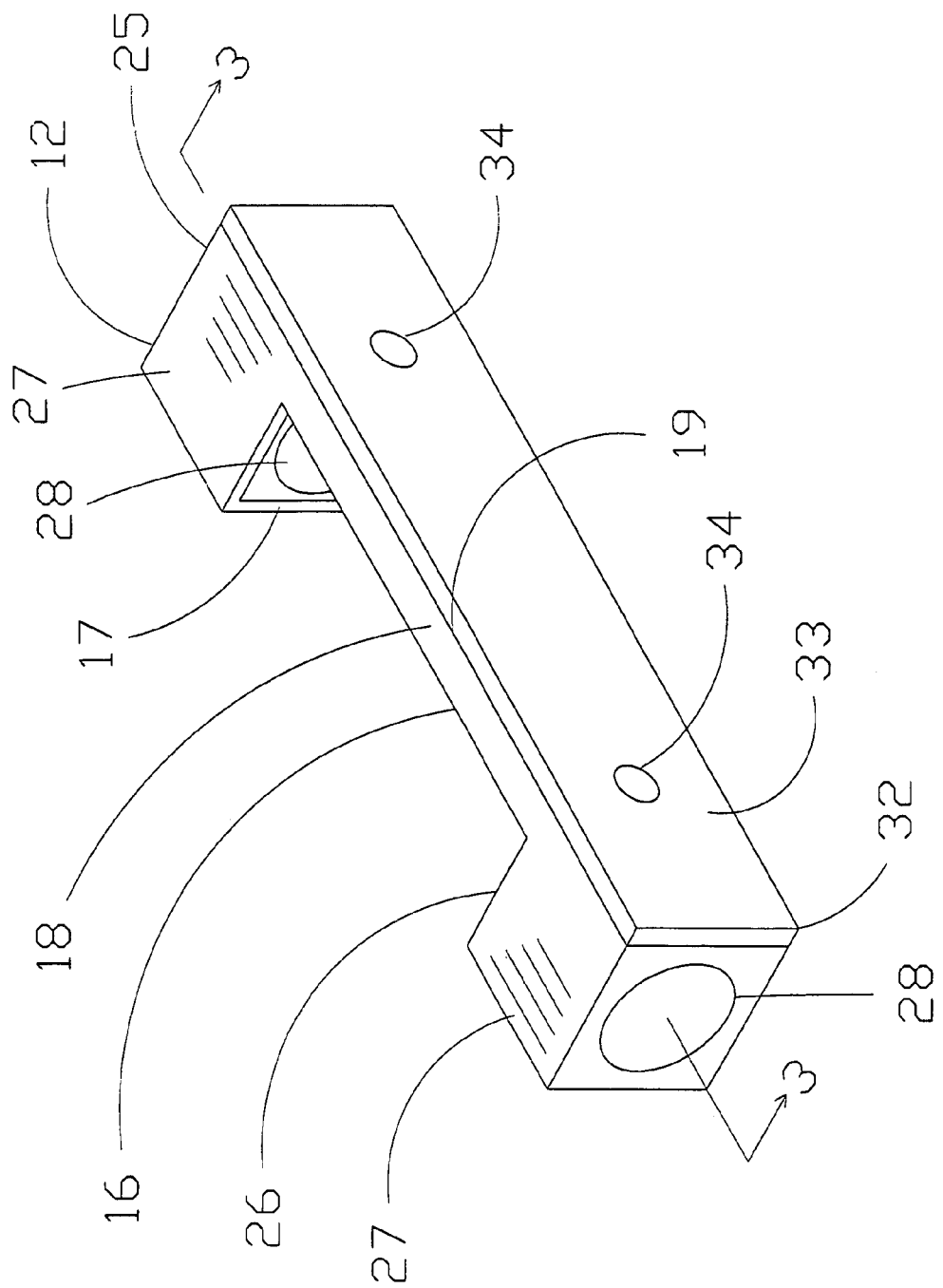
FIG. 2 is a perspective view of one of the light emitting members inserted into one of the holder members of the present invention.
Figure 3:
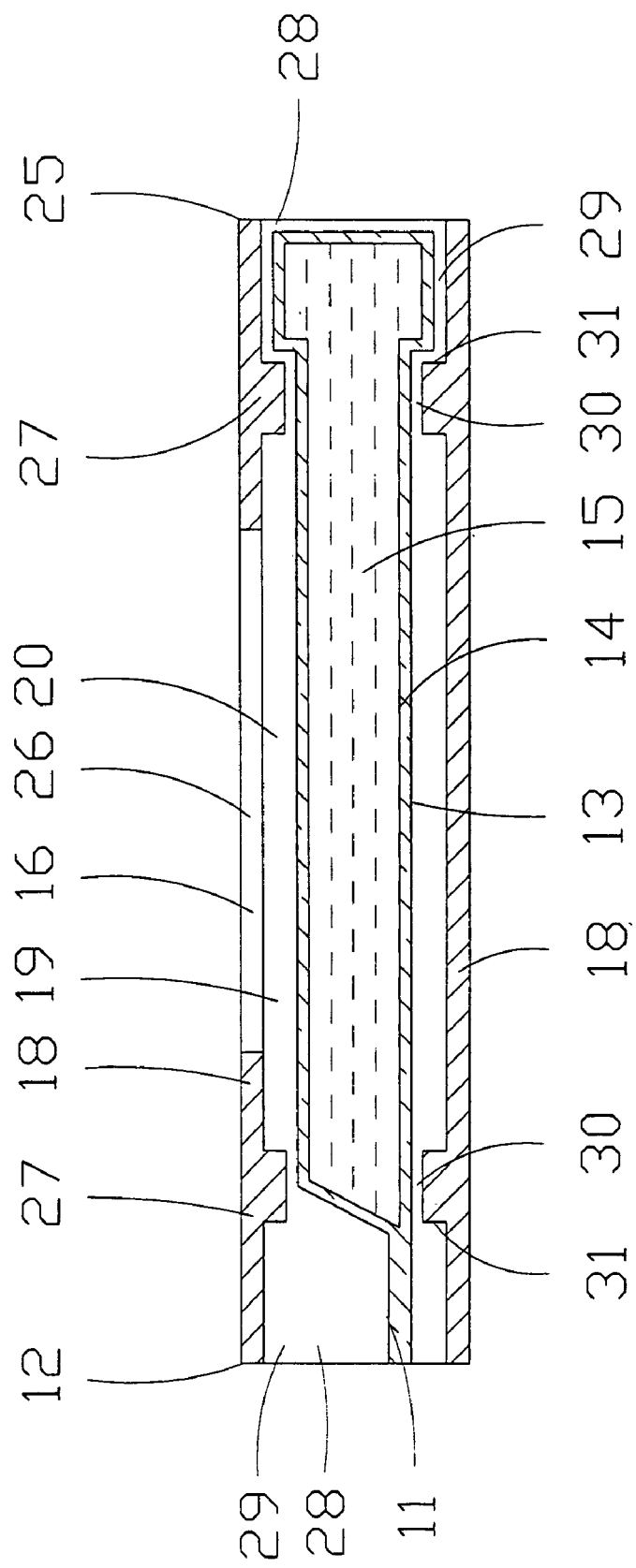
FIG. 3 is a cross-sectional view of the present invention taken along line 3—3 of FIG. 2.

With reference now to the drawings, and in particular to FIGS. 1 through 3 thereof, a new emergency light system embodying the principles and concepts of the present invention and generally designated by the reference numeral 10 will be described.

As best illustrated in FIGS. 1 through 3, the emergency light system 10 generally comprises a plurality of light emitting members 11 being designed for being coupled to the vehicle whereby each of the light emitting members 11 emits light to visually indicate the location of the vehicle.

Each of a plurality of holder members 12 selectively receives one of the light emitting members 11. Each of the holder members 12 is designed for being coupled to the vehicle whereby each of the holder members 12 is for selectively securing the light emitting members 11 to the vehicle.

Each of the light emitting members 11 comprises a perimeter wall 13. The perimeter wall 13 defines an interior space 14 of the associated one of the light emitting members 11.

Each of the light emitting members 11 comprises a light emitting means 15 for emitting visible light. The light emitting means 15 is positioned in the interior space 14 of the associated one of the light emitting members 11 whereby the light emitting means 15 is for emitting light through the perimeter wall 13 of the associated one of the light emitting members 11. The light emitting means 15 comprises a chemical compound. The chemical compound is chemiluminescent when the chemical compound is mixed by the user.

Each of the holder members 12 comprises a sleeve portion 16. The sleeve portion 16 is for selectively receiving one of the light emitting members 11 whereby the sleeve portion 16 is for permitting light from the associated one of the light emitting members 11 to be viewed.

The sleeve portion 16 of each of the holder members 12 comprises a front wall 17, a pair of side walls 18 and a rear wall 19. The front wall 17, the side walls 18 and the rear wall 19 define a sleeve space 20 of the sleeve portion 16. The sleeve space 20 is for receiving one of the light emitting members 11.

The holder members 12 comprise a stern holder member 21. The front wall 17 of the sleeve portion 16 of the stern holder member 21 comprises a stern aperture 22 extending through the front wall 17 of the sleeve portion 16. The stern member is designed for being coupled to a rear of the vehicle, such as a stern of a boat, whereby the stern aperture 22 is for permitting light from one of the light emitting members 11 to be viewed from behind the vehicle.

The holder members 12 comprise a bow holder member 23. The sleeve portion 16 of the bow holder member 23 comprises a bow aperture 24 whereby the bow aperture 24 extends through the front wall 17 and portion of each of the sidewalls 18 of the sleeve portion 16 of the bow holder member 23. The bow holder member 23 is designed for being coupled to a front of the vehicle, such as the bow of a boat, whereby the bow aperture 24 is for permitting light from one of the light emitting members 11 to be viewed from in front of the vehicle.

The holder members 12 comprise a pair of side holder members 25. The sleeve portion 16 of each of the side holder members 25 comprises a side aperture 26 whereby the side aperture 26 extends through the front wall 17 and a portion of one of the side walls 18 of the sleeve portion 16 of the associated one of the side holder members 25. Each of the side holder members 25 is designed for being coupled to one of a pair of sides of the vehicle, such as the starboard and port sides of a boat, whereby the side aperture 26 is for permitting light from one of the light emitting members 11 to be viewed from the side of the vehicle.

Each of the holder members 12 comprises a pair of end portions 27. Each of the end portions 27 is coupled to the sleeve portion 16 of the associated one of the holder members 12 whereby one of the end portions 27 is positioned opposite the other one of the end portions 27. Each of the end portions 27 comprises a bore 28 whereby the bore 28 of each of the end portions 27 is in communication with the sleeve portion 16 of the associated one of the holder members 12. The bore 28 of each of the end portions 27 is for maintaining alignment of one of the light emitting members 11 when one of the light emitting members 11 is inserted to the sleeve portion 16 of the associated one of the holder members 12.

The bore 28 of each of the end portions 27 comprises a first portion 29 and a second portion 30. The first portion 29 comprises a diameter greater than a diameter of the second portion 30 whereby a lip 31 is formed between the first portion 29 and the second portion 30. The lip 31 is for engaging a raised portion of one of the light emitting members 11 to inhibit the associated one of the light emitting members 11 from passing completely through the associated one of the holder members 12.

Each of the holder members 12 comprises a mounting portion 32. The mounting portion 32 is designed for selectively securing the associated one of the holder members 12 to the vehicle.

In an embodiment, the mounting portion 32 of each of the holder members 12 comprises an adhesive material 33. The adhesive material 33 is designed for selectively securing the associated one of the holder members 12 to the vehicle.

In an embodiment, the mounting portion 32 of the each of the holder members 12 comprises a plurality of fastener apertures 34. Each of the fastener apertures 34 extending thought the associated one of the holder members 12. Each of the fastener apertures 34 is designed for receiving a fastener whereby the associated one of the holder members 12 can be selectively secured to the vehicle.

In use, the user mounts the stern holder member 21 to the stern of the vehicle. The bow holder member 23 is coupled to the bow of the vehicle. The side holder members 25 are coupled to the starboard and port sides of the vehicle. The light emitting members 11 are actuated to allow the chemical compound to mix and to emit light through chemiluminescence. The light emitting members 11 are then inserted into the holder members 12 to allow the vehicle to be viewed. To conform to boating illumination standards one of the light emitting members 11 would emit a green light and be inserted into the one of the side holder members 25 on the starboard side of the vehicle. One of the light emitting members 11 would emit a red light and being inserted into the one of the side holder members 25 on the port side of the vehicle. Light emitting members emitting a white light would be inserted into the stern holder member 21 and the bow holder member 23.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency light system for a vehicle to enhance visibility of the vehicle during an emergency, the emergency light system comprising:

a plurality of light emitting members being adapted for being coupled to the vehicle such that each of said light emitting members emits light to visually indicate the location of the vehicle;

a plurality of holder members each removably receiving one of the light emitting members; and each of said light emitting members being elongated with a longitudinal axis between opposite ends;

each of said holder members comprising a pair of spaced walls, a bore extending through each of said spaced walls and removably receiving a portion of said light emitting member;

each of said holder members comprising a mounting portion for selectively securing the associated one of said holder members to the vehicle, said mounting portion of each of said holder members extending between said spaced walls of said associated holder member, said mounting portion having a substantially planar surface for positioning against the vehicle, said substantially planar surface being oriented substantially parallel to the longitudinal axis of said light emitting member removably received in the bores of said spaced walls.

2. The emergency light system as set forth in claim 1, further comprising:

each of said light emitting members comprising a perimeter wall, said perimeter wall defining an interior space of the associated one of said light emitting members;

each of said light emitting members comprising a light emitting means for emitting visible light, said light emitting means being positioned in said interior space of the associated one of said light emitting members such that said light emitting means is for emitting light through said perimeter wall of the associated one of said light emitting members.

3. The emergency light system as set forth in claim 2, further comprising:

said light emitting means comprising a chemical compound, said chemical compound being chemiluminescent when said chemical compound is mixed by the user.

4. The emergency light system as set forth in claim 1, further comprising:

each of said holder members comprising a front wall, a pair of sidewalls and a rear wall, said front wall, said sidewalls and said rear wall defining a sleeve space, said sleeve space being for receiving one of said light emitting members.

5. The emergency light system as set forth in claim 4, further comprising:

said holder members comprising a stern holder member, said front wall of said sleeve portion of said stern holder member comprising a stern aperture extending through said front wall, said stern member being adapted for being coupled to a rear of the vehicle such that said stern aperture is for permitting light from one of said light emitting members to be viewed from behind the vehicle.

6. The emergency light system as set forth in claim 4, further comprising:

said holder members comprising a bow holder member, said bow holder member comprising a bow aperture such that said bow aperture extends through said front wall and portion of each of said sidewalls of said bow holder member, said bow holder member being adapted for being coupled to a front of the vehicle such that said bow aperture is for permitting light from one of said light emitting members to viewed from in front of the vehicle.

7. The emergency light system as set forth in claim 1, further comprising:

said bore of each of said end walls comprising a first portion and a second portion, said first portion comprising a diameter greater than a diameter of said second portion such that a lip is formed between said first portion and said second portion, said lip being for engaging a raised portion of one of said light emitting members to inhibit the associated one of said light emitting members from passing completely through the associated one of said holder members.

8. The emergency light system as set forth in claim 1, further comprising:

said mounting portion of each of said holder members comprising an adhesive material, said adhesive material being adapted for selectively securing the associated one of said holder members to the vehicle.

9. The emergency light system as set forth in claim 1, further comprising:

said mounting portion of said each of said holder members comprising a plurality of fastener apertures, each of said fastener apertures extending through said mounting portion, each of said fastener apertures being adapted for receiving a fastener such that the associated one of said holder members can be selectively secured to the vehicle.

10. An emergency light system for a vehicle to enhance visibility of the vehicle during an emergency, the emergency light system comprising:

a plurality of light emitting members being adapted for being coupled to the vehicle such that each of said light emitting, members emits light to visually indicate the location of the vehicle;

each of a plurality of holder members selectively receiving one of the light emitting members, each of said holder members being adapted for being coupled to the vehicle such that each of said holder members is for selectively securing said light emitting members to the vehicle; and each of said holder members comprising a mounting portion, said mounting, portion being adapted for selectively securing the associated one of said holder members to the vehicle, said mounting portion of each of said holder members being positioned between the associated one of the light emitting members and the vehicle, said mounting portion being positioned substantially parallel to the associated one of said light emitting members when one of said light emitting members is received by the associated one of said holder members;

each of said holder members comprising a sleeve portion, said sleeve portion being for selectively receiving one of said light emitting members such that said sleeve portion is for permitting light from the associated one of said light emitting members to be viewed;

said sleeve portion of each of said holder members comprising a front wall, a pair of sidewalls and a rear wall, said front wall, said sidewalls and said rear wall defining a sleeve space of said sleeve portion, said sleeve space being for receiving one of said light emitting members;

said holder members comprising a pair of side holder members, said sleeve portion of each of said side holder members comprising a side aperture such that said side aperture extends through said front wall and a portion of one of said sidewalls of said sleeve portion of the associated one of said side holder members, each of said side holder members being adapted for being coupled to one of a pair of sides of the vehicle such that said side aperture is for permitting light from one of said light emitting members to be viewed from the side of the vehicle.

11. An emergency light system for a vehicle to enhance visibility of the vehicle during an emergency, the emergency light system comprising:

a plurality of light emitting members being adapted for being coupled to the vehicle such that each of said light emitting members emits light to visually indicate the location of the vehicle;

each of a plurality of holder members selectively receiving one of the light emitting members, each of said holder members being adapted for being coupled to the vehicle such that each of said holder members is for selectively securing said light emitting members to the vehicle;

each of said light emitting members comprising a perimeter wall, said perimeter wall defining an interior space of the associated one of said light emitting members;

each of said light emitting members comprising a light emitting means for emitting visible light, said light emitting means being positioned in said interior space of the associated one of said light emitting members such that said light emitting means is for emitting light through said perimeter wall of the associated one of said light emitting members;

said light emitting means comprising a chemical compound, said chemical compound being chemiluminescent when said chemical compound is mixed by the user;

each of said holder members comprising a sleeve portion, said sleeve portion being for selectively receiving one of said light emitting members such that said sleeve portion is for permitting light from the associated one of said light emitting members to be viewed;

said sleeve portion of each of said holder members comprising a front wall, a pair of side walls and a rear wall, said front wall, said sidewalls and said rear wall defining a sleeve space of said sleeve portion, said sleeve space being for receiving one of said light emitting members;

said holder members comprising a stern holder member, said front wall of said sleeve portion of said stern holder member comprising a stern aperture extending through said front wall of said sleeve portion, said stern member being adapted for being coupled to a rear of the vehicle such that said stern aperture is for permitting light from one of said light emitting members to be viewed from behind the vehicle;

said holder members comprising a bow holder member, said sleeve portion of said bow holder member comprising a bow aperture such that said bow aperture extends through said front wall and portion of each of said sidewalls of said sleeve portion of said bow holder member, said bow holder member being adapted for being coupled to a front of the vehicle such that said bow aperture is for permitting light from one of said light emitting members to viewed from in front of the vehicle;

said holder members comprising a pair of side holder members, said sleeve portion of each of said side holder members comprising a side aperture such that said side aperture extends through said front wall and a portion of one of said sidewalls of said sleeve portion of the associated one of said side holder members, each of said side holder members being adapted for being coupled to one of a pair of sides of the vehicle such that said side aperture is for permitting light from one of said light emitting members to be viewed from the side of the vehicle;

each of said holder members comprising a pair of end portions, each of said end portions being coupled to said sleeve portion of the associated one of said holder members such that one of said end portions is positioned opposite the other one of said end portions, each of said end portions comprising a bore such that said bore of each of said end portions is in communication with said sleeve portion of the associated one of said holder members, said bore of each of said end portions being for maintaining alignment of one of said light emitting members when one of said light emitting members is inserted to said sleeve portion of the associated one of said holder members;

said bore of each of said end portions comprising a first portion and a second portion, said first portion comprising a diameter greater than a diameter of said second portion such that a lip is formed between said first portion and said second portion, said lip being for engaging a raised portion of one of said light emitting members to inhibit the associated one of said light emitting members from passing completely through the associated one of said holder members; and each of said holder members comprising a mounting portion, said mounting portion being adapted for selectively securing the associated one of said holder members to the vehicle, said mounting portion of each of said holder members being positioned between the associated one of the light emitting members and the vehicle, said mounting portion being positioned substantially parallel to the associated one of said light emitting members when one of said light emitting members is received by the associated one of said holder members.

12. The emergency light system as set forth in claim 11, further comprising:

said mounting portion of each of said holder members comprising an adhesive material, said adhesive material being adapted for selectively securing the associated one of said holder members to the vehicle.

13. The emergency light system as set forth in claim 11, further comprising;

said mounting portion of said each of said holder members comprising a plurality of fastener apertures, each of said fastener apertures extending through said mounting portion, each of said fastener apertures being adapted for receiving a fastener such that the associated one of said holder members can be selectively secured to the vehicle.

* * * * *